United States Patent [19]

De Lorean

[11] Patent Number: 5,115,852
[45] Date of Patent: May 26, 1992

[54] CLOSED-TORUS TIRE AND METHOD FOR MANUFACTURING SAME

[76] Inventor: John Z. De Lorean, 834 Fifth Ave., New York, N.Y. 10021

[21] Appl. No.: 346,144

[22] Filed: May 1, 1989

[51] Int. Cl.⁵ .................. B60C 17/01; B29D 30/00
[52] U.S. Cl. .................... 152/518; 152/516; 152/520; 156/119; 156/123
[58] Field of Search ............ 152/516, 518, 520; 156/110.1, 118, 119, 123

[56] References Cited

U.S. PATENT DOCUMENTS

| | | |
|---|---|---|
| 2,970,344 | 2/1961 | Morris . |
| 3,941,176 | 3/1976 | Schwartz . |
| 4,008,743 | 2/1977 | Welch . |
| 4,052,237 | 11/1977 | Appleby et al. . |
| 4,110,141 | 8/1978 | Caravito ............... 156/123 R |
| 4,121,640 | 10/1978 | Henning ............... 152/518 |
| 4,216,809 | 8/1980 | Pixlay . |
| 4,253,510 | 3/1981 | De Lorean . |
| 4,257,467 | 3/1981 | Van der Burg . |
| 4,265,290 | 5/1981 | Jackson . |
| 4,699,578 | 11/1987 | Sumner et al. . |

FOREIGN PATENT DOCUMENTS

2622854 12/1977 Fed. Rep. of Germany ...... 152/520

*Primary Examiner*—Jeff H. Aftergut
*Attorney, Agent, or Firm*—R. Neil Sudol; Henry D. Coleman

[57] ABSTRACT

A mold member for use in manufacturing a closed-torus tire comprises an annular inflatable resilient member having a substantially cylindrical inner wall and a corrugated outer wall opposed thereto. At the beginning of a tire manufacturing process, the mold member is expanded from its corrugated shape into a perfect toroid. A layer of rubber is first wrapped around the toroid and then a filament or cord is wound about the rubber. Upon the completion of the winding operation, additional rubber material is molded in a toroidal shape about the filament or cord so that the cord is fully embedded in rubber. Simultaneously with the molding operation, the additional rubber material is cast to a central wheel member. After vulcanization, the mold member is deflated from the expanded toroidal shape to the original corrugated form and the mold member is retained in the tire as a run-flat component, the corrugations forming a bumpy riding surface to inform a driver that a flat has occurred.

50 Claims, 6 Drawing Sheets

CLOSED-TORUS TIRE AND METHOD FOR MANUFACTURING SAME

BACKGROUND OF THE INVENTION

This invention pertains to a closed-torus tire and a method for manufacturing the tire. More particularly, this invention pertains to a closed-torus tire with a run-flat member and a related manufacturing technique. This invention also relates to a mold member to be used in the manufacture of the tire.

As discussed in U.S. Pat. No. 4,052,237 to Appleby, closed-torus tires with wound reinforcement filaments or cords embedded in a vulcanized rubber material are conventionally built through the use of a rigid core having an outside surface corresponding to the desired inside shape of the inflation chamber of the tire. To remove such a rigid core from the finished tire, the core is first reduced to a fluidized state and then washed out through the inflation inlet or valve of the tire. Molding cores are frequently constructed of a material such as plaster of paris which can be dissolved by mild acids such as acetic acid. Clearly, a disadvantage of this conventional manufacturing method is the time and energy required for removing the cores from the tires.

It is known to modify such a manufacturing technique to produce a closed-torus tire which is integrally molded or cast to a metal wheel body. See, for example, U.S. Pat. No. 4,253,510 to De Lorean. This method of manufacturing the tire so that the rubber material of the tire is attached to the wheel body integrally over a relatively large continuous area eliminates the need to provide beads or other means for enabling the attachment of the tire to a wheel rim.

Two-chamber safety tires with internal run-flat members have been subjected to considerable development and improvement. U.S. Pat. No. 3,941,176 to Schwartz, for example, discloses a safety tire having an outer chamber constituted by a conventional tubeless tire and a toroidal inner chamber made of a thermoplastic elastomer such as a polyetherester or a polyurethane. U.S. Pat. No. 4,008,743 to Welch also shows a two-chamber safety tire formed with an internal toroidal safety structure in the form of an inflatable tube or flexible resilient foam member bearing along a circumferential zone one or more superimposed layers of cord reinforced strips. U.S. Pat. No. 4,216,809 to Pixley similarly relates to a pneumatic tire having a run-flat insert structure in turn comprising a fully enclosed and pneumatically inflated elastomeric member mounted within the cavity formed by the pneumatic tire and the wheel rim upon which the tire is mounted. U.S. Pat. No. 4,257,467 to Van der Burg describes and illustrates a run-flat tire with toroidal inner tube for clamping the beads of an external tire member to a wheel rim and with a toroidal metal support element concentric with the inner tube and having two pluralities of strip-like prongs extending radially from axially opposite sides of the support element, the prongs being arcuately bent so as to be interleaved and spaced from one another in a circumferential direction. U.S. Pat. No. 4,265,290 to Jackson discloses a pneumatic tire and wheel rim assembly including a hoop for supporting the vehicle when an external tire member is punctured or otherwise deflated. All of these run-flat tire assemblies have open-cavity external tire members with beads for seating the tire members on the rim of a wheel.

It is to be noted that such external tire members are conventionally formed in part through the utilization of a curing bag which is inflated inside the tire member to maintain the shape of that member during vulcanization. See, for example, U.S. Pat. No. 2,970,344 to Morris and U.S. Pat. No. 4,699,578 to Sumner et al.

OBJECTS OF THE INVENTION

An object of the present invention is to provide a novel method for manufacturing a closed torus tire, which is less time consuming and more efficient than conventional manufacturing techniques.

Another object of the present invention is to provide a new kind of closed-torus tire and a method for manufacturing the tire.

Another, more particular, object of the present invention is to provide such a closed-torus tire with a run-flat member.

Another, associated, object of the present invention is to provide a method for manufacturing such a run-flat tire.

A further particular object of the present invention is to provide an internal mold member for use in manufacturing a closed-torus tire.

Yet another particular object of the present invention is to provide a novel run-flat tire member.

SUMMARY OF THE INVENTION

The present invention is directed in part to a method for manufacturing a tire, comprising the steps of (a) providing an annular internal mold member made of a resilient material with a memory, (b) expanding the mold member from its predetermined annular shape into a toroidal shape, (c) forming a closed torus external tire member about the mold member, (d) maintaining the mold member in the expanded toroidal shape during molding of the tire member, (e) upon formation of the tire member, contracting the mold member from the toroidal shape so that the mold member resumes the annular shape, and (f) retaining the mold member in the tire member so that the mold member becomes a permanently incorporated part of the tire. It is particularly advantageous to incorporate the mold member as a run-flat member of the tire.

Pursuant to a feature of the present invention, the mold member has a substantially cylindrical inner wall and a corrugated opposed outer wall. More particularly, the outer wall has a radial width dimension which varies between a maximum value and a minimum value, preferably with a predetermined angular periodicity. Accordingly, the mold member is formed with portions having a maximum width interleaved along a circumferential direction with portions having a minimum width.

Preferably, the mold member is made of synthetic resin material such as polyethylene.

Pursuant to further features of the present invention, the step of expanding the mold member includes the step of pressurizing the mold member with a fluid, i.e., a gas or a liquid, while the step of contracting includes the step of withdrawing fluid from the expanded mold member, for example, by applying suction to an annular chamber defined by the mold member in its expanded toroidal shape. The step of contracting may also include the step of pressurizing a space located between the mold member and the tire member. The pressurization or depressurization is preferably implemented through valves communicating with the respective internal spaces.

Pursuant to yet another feature of the present invention, the mold member is heated, preferably both prior to the expansion of the mold member from the original annular shape and later upon formation of the tire member and prior to the step of contracting the mold member. In a particular embodiment of the invention, the heating of the mold member is accomplished by applying microwave energy. Alternatively, the mold member may be made of a material incorporating metallic particles, the heating being achieved by induction. In addition, the initial heating of the mold member may be accomplished at least in part by injecting a heated fluid into the mold member prior to or at the onset of the expansion step.

In accordance with yet further features of the present invention, the step of forming the tire member includes (a) the wrapping of a layer of rubber about the mold member upon expansion thereof into the toroidal shape, (b) the winding of a filament or cord about the layer of rubber, (c) the molding of additional rubber material in a toroidal form about the wound cord, the layer of rubber and the mold member, and (d) subsequently vulcanizing the molded rubber material.

A tire made in accordance with the present invention comprises an annular run-flat member, a closed-torus outer tire member substantially surrounding the run-flat member, and means for attaching the outer tire member at an axle of a vehicle such as an automobile or truck.

In a particular embodiment of the present invention, the run-flat member has a substantially cylindrical inner wall and a corrugated opposed outer wall. Advantageously, the run-flat member has a radial width dimension which varies between a maximum value and a minimum value, preferably with a predetermined angular periodicity. In addition, the run-flat member is preferably made of a synthetic resin material with a memory, such as polyethylene.

In some applications, it is desirable for the outer tire member to include a wound elongate tensile element embedded in a rubber material.

The outer tire member may be attached at a vehicle's axle by a wheel member, the outer tire member being fastened thereto preferably by an integral molding or casting of the tire to the wheel member.

BRIEF DESCRIPTION OF THE DRAWING

FIG. 9 is partially a block diagram and partially a cross-sectional view, showing another alternative assembly for heating mold member 20 during different stages of the manufacturing process of FIG. 7.

DETAILED DESCRIPTION

Figure 3:
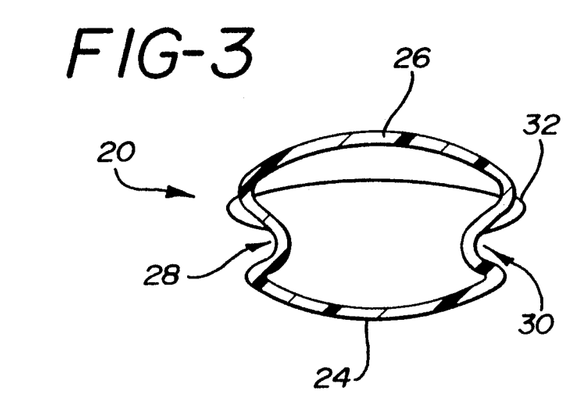
FIG. 3 is a cross-sectional view taken along line III—III in FIG. 1.
Figure 4:
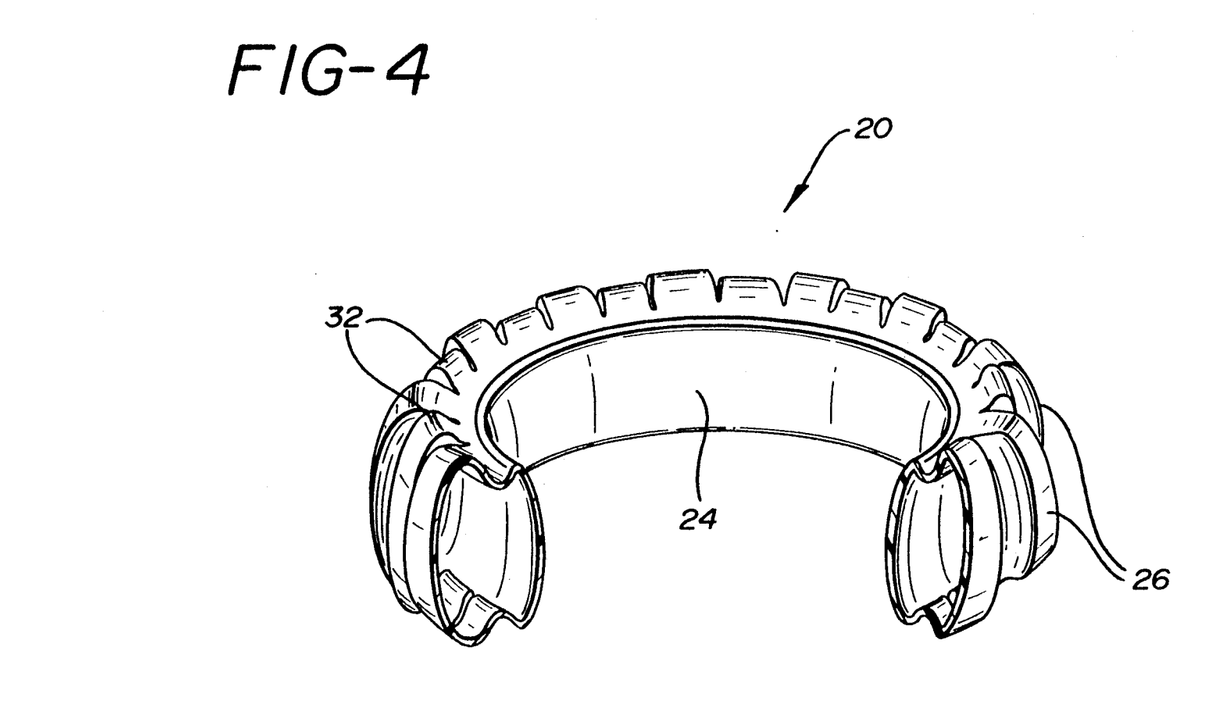
FIG. 4 is a perspective view, partially broken away, of the mold member depicted in FIGS. 1-3.
Figure 5:
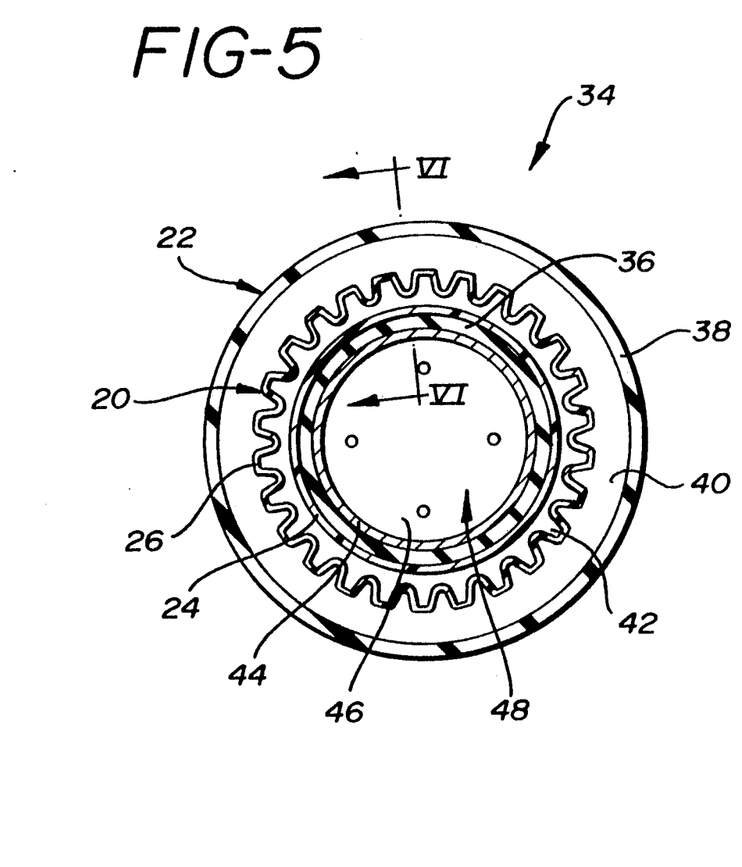
FIG. 5 is a cross-sectional view, similar to FIG. 1, of a closed-torus tire incorporating the mold member of FIGS. 1-4 as a run-flat member, in accordance with the present invention.
Figure 6:
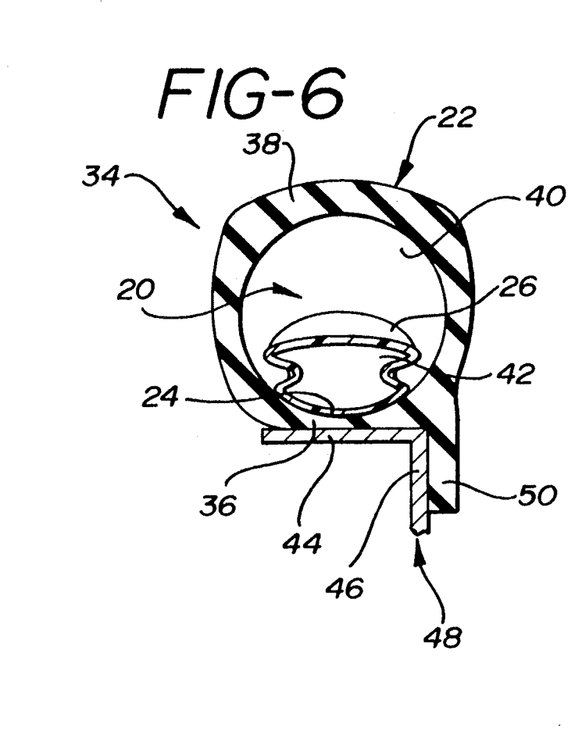
FIG. 6 is a cross-sectional view taken along line VI—VI in FIG. 5.

FIGS. 1-4 illustrate an inflatable annular member 20 used as an internal mold piece during manufacture of an external tire member 22 (FIGS. 5 and 6). As described hereinafter in detail with reference to FIG. 7, upon the completion of the molding process, annular member 20 is contracted or deflated from an expanded toroidal form and becomes an integral run-flat member of the finished tire.

Annular mold member 20 is made of a resilient material having a memory. Preferably, the resilient material is a synthetic resin material, such as polyethylene. The memory characteristic of the material enables mold member 20 to resume its original annular shape upon the completion of a molding process.

As illustrated in FIGS. 1-4, mold member 20 is formed with a substantially cylindrical inner wall 24 and a corrugated opposed outer wall 26. Mold member 20 has a radial width dimension W varying in a circumferential direction C between a maximum value Mx and a minimum value Mn. Preferably, radial width dimension W varies with a predetermined angular periodicity between maximum value Mx and said minimum value Mn. The variation in radial width dimension W and, concomitantly, the corrugated shape of outer wall 26, serves to provide a bumpy riding surface, thereby signaling to a driver that the outer tire member has been punctured and that he is now riding on run-flat mold member 20.

Figure 1:
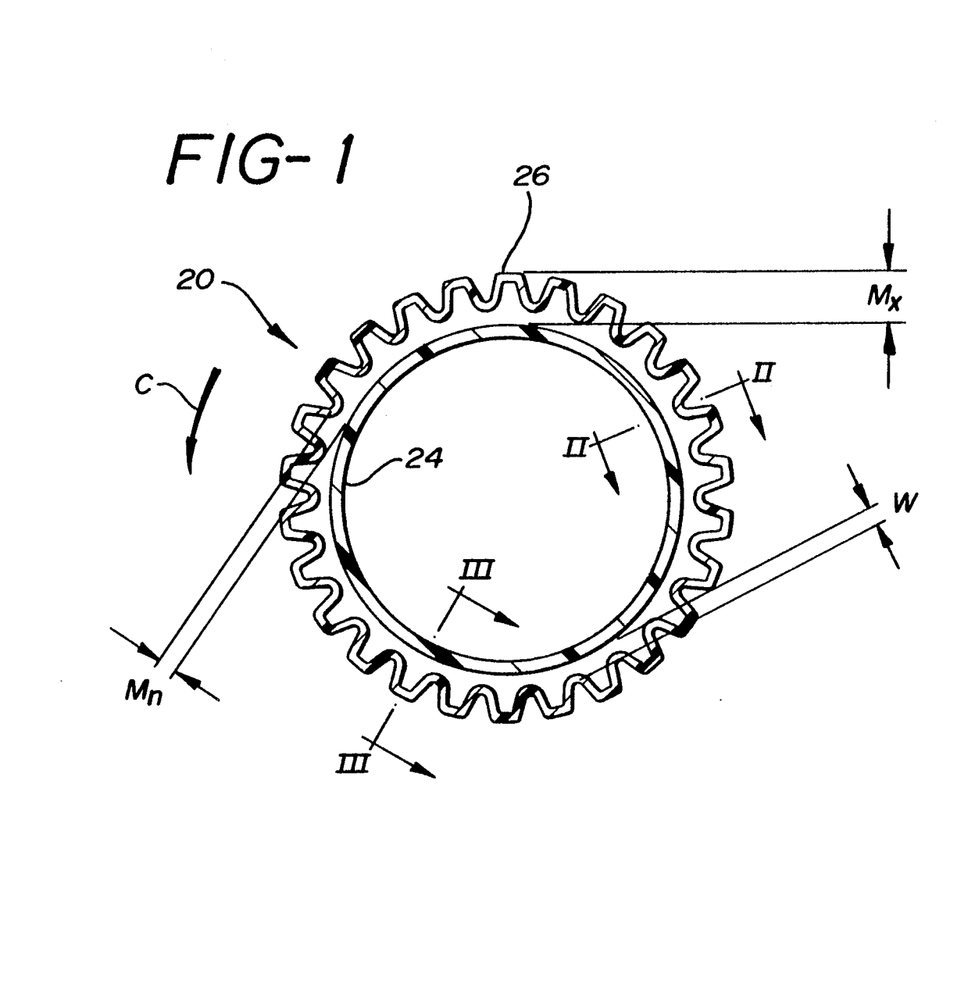
FIG. 1 is a cross-sectional view of a mold member, taken along a plane oriented perpendicularly to an axis of symmetry of the mold member, utilizable in a method according to the present invention for manufacturing a closed-torus tire.
Figure 2:
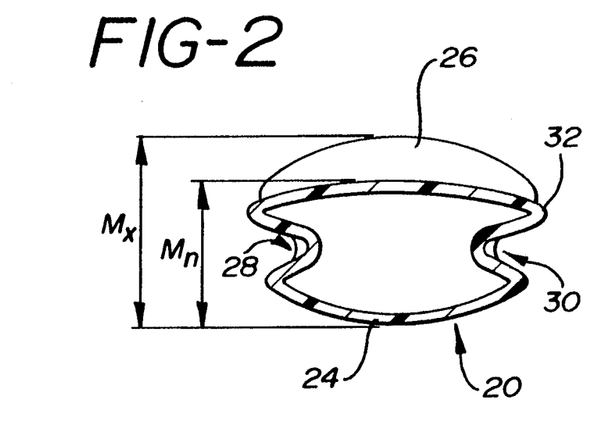
FIG. 2 is a cross-sectional view taken along line II—II in FIG. 1.

As depicted in FIGS. 2-4, mold member 20 has irregular side walls 28 and 30 formed with regularly occurring protrusions 32 associated with areas of minimum radial width value Mn. Protrusions 32 provide additional elastomeric material required to enable mold member 20 to assume a substantially perfectly toroidal shape (see FIG. 7) upon expansion or inflation thereof prior to a rubber molding manufacturing step. Mold Member 20 itself may be produced by a blow-molding operation.

As shown in FIGS. 5 and 6, a closed-torus tire 34 incorporating mold member 20 as a run-flat component includes closed-torus external tire member 22 toroidally surrounding mold member 20. Inner wall 24 of mold member 20 engages an inner surface of a substantially cylindrical inner wall 36 of tire member 22, while outer wall 26 is radially spaced from an outer wall 38 of tire member 22 to define an outer annular chamber 40. A inner annular chamber 42 is formed by mold member 20. External tire member 22 is molded or cast to both a substantially cylindrical rim or flange 44 and a substantially planar main body portion 46 of a wheel member 48, so that the tire is integrally fastened to the wheel member and requires no beads or other structure for enabling the fastening of the tire to the wheel. Tire member 22 includes a radially inwardly projecting annular extension 50 integrally cast to wheel body 46.

Figure 7:
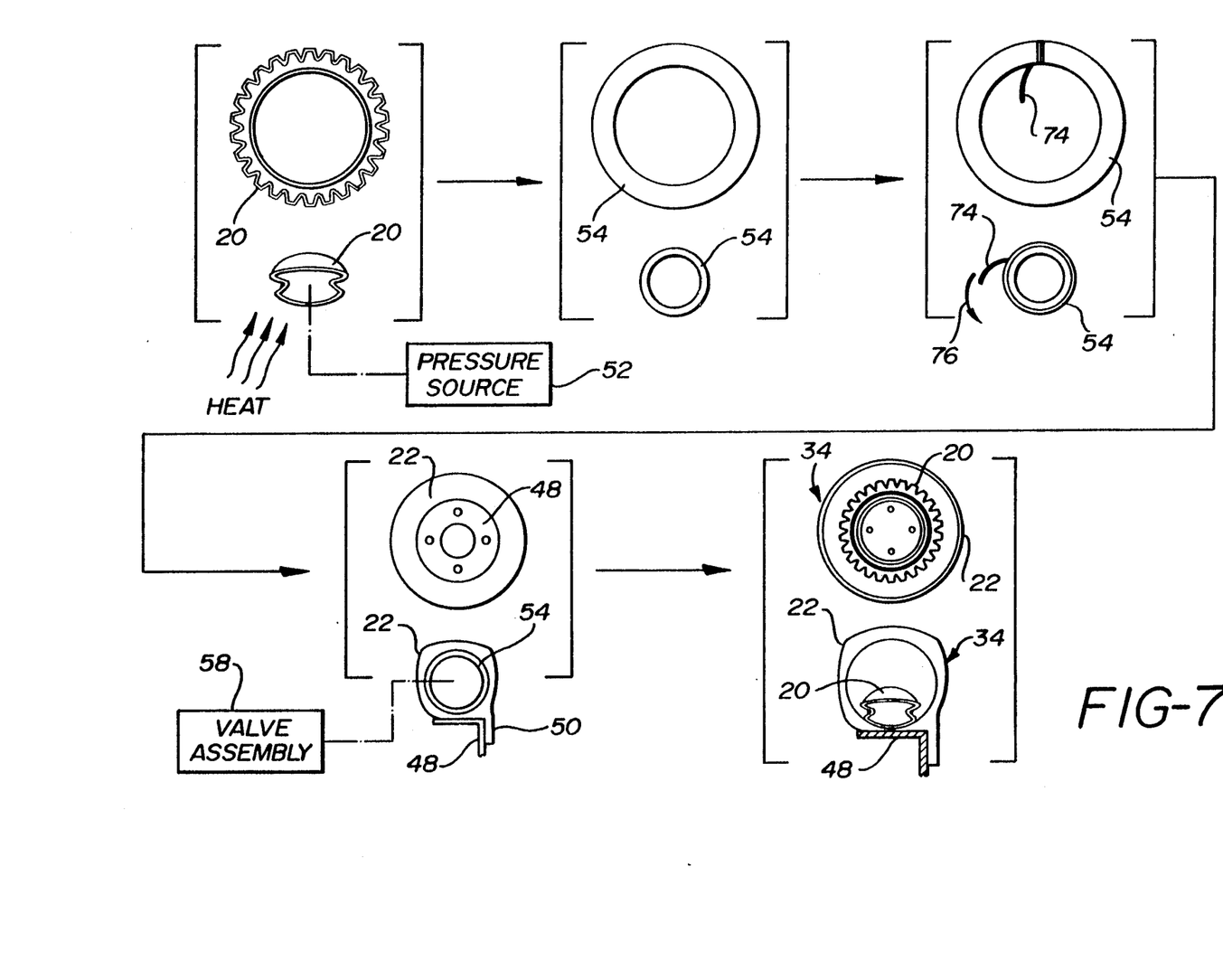
FIG. 7 is a diagram schematically illustrating successive steps in the manufacture of the tire shown in FIGS. 5 and 6.

FIG. 7 schematically illustrates a sequence of steps executed during manufacture of the closed-torus tire of FIGS. 5 and 6 in accordance with the present invention. Each step is represented by a pair of views within brackets, an upper view being a side elevational or cross-sectional view similar to FIGS. 1 and 5 and a lower view being a corresponding cross-sectional view similar to FIGS. 2, 3 and 6. The two views for each step are, for purposes of illustration, on different scales.

Initially, mold member 20 is heated and then pressurized with fluid (liquid or gas) from a pressure source 52 to expand the mold member from the externally corrugated annular shape depicted in FIGS. 1-4 to a perfectly toroidal shape 54.

Figure 8:
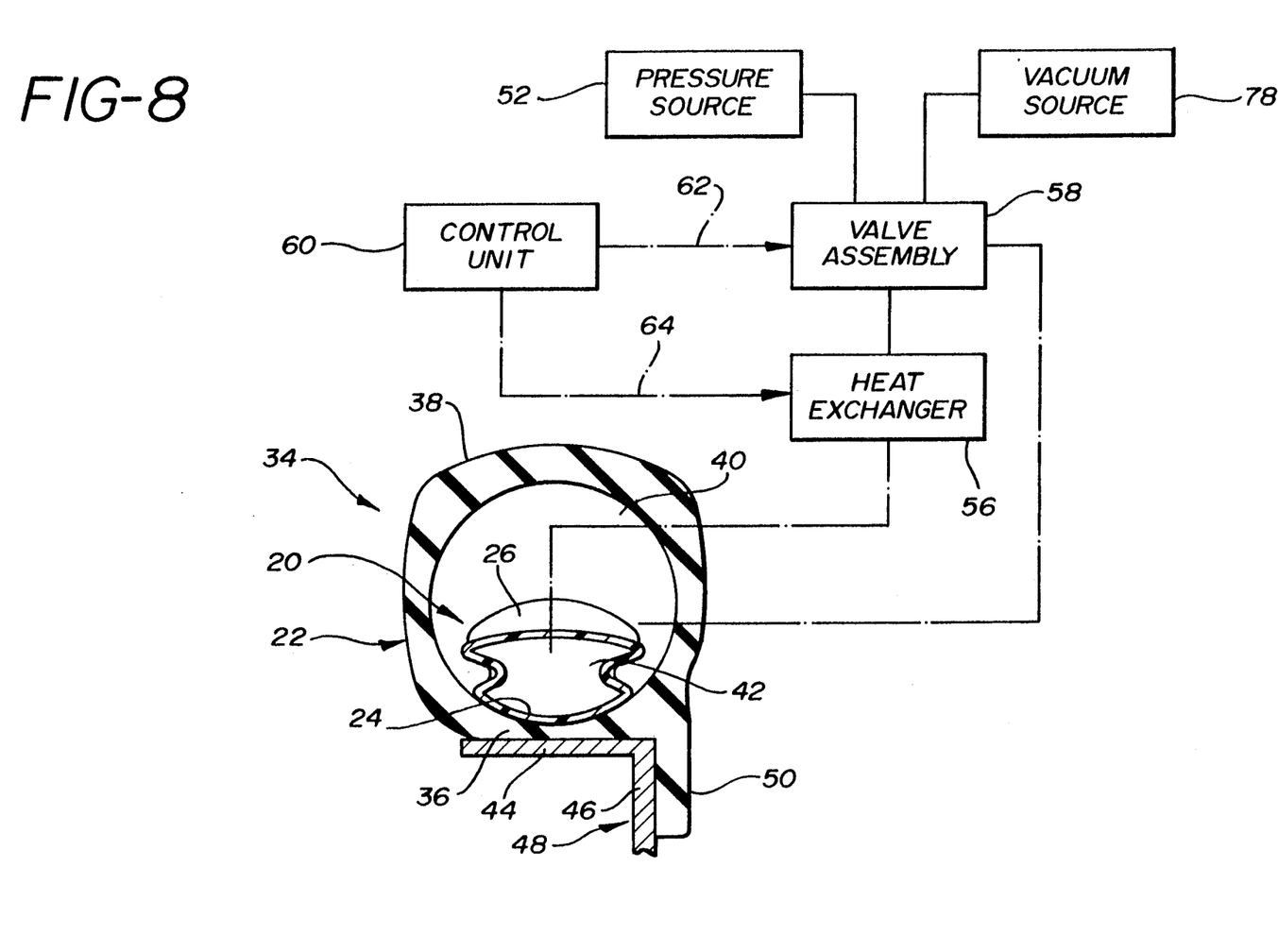
FIG. 8 is partially a block diagram and partially a cross-sectional view, showing an assembly for expanding, contracting and heating mold member 20 during different stages of the manufacturing process of FIG. 7.

FIG. 8 shows an assembly for heating and expanding mold member 20 prior to the formation of external tire member 22 and for heating and contracting mold member 20 upon the completion of a molding step. Pursuant to FIG. 8, the heating of mold member 20 may be accomplished during the initial manufacturing step of FIG. 7 by heating the pressurizing fluid in a heat exchanger 56. To that end, heat exchanger 56 communicates on an outlet side with inner chamber 42 of mold member 20, preferably through a valve element (not illustrated) connected to mold member 20. On an inlet side, heat exchanger 56 communicates with pressure source 52 via a valve assembly 58. Valve assembly 58 may be actuated and the operation of heat exchanger 56 may be synchronized therewith in response to signals arriving from a control unit 60 via respective electrical leads or multiples 62 and 64.

Figure 9:
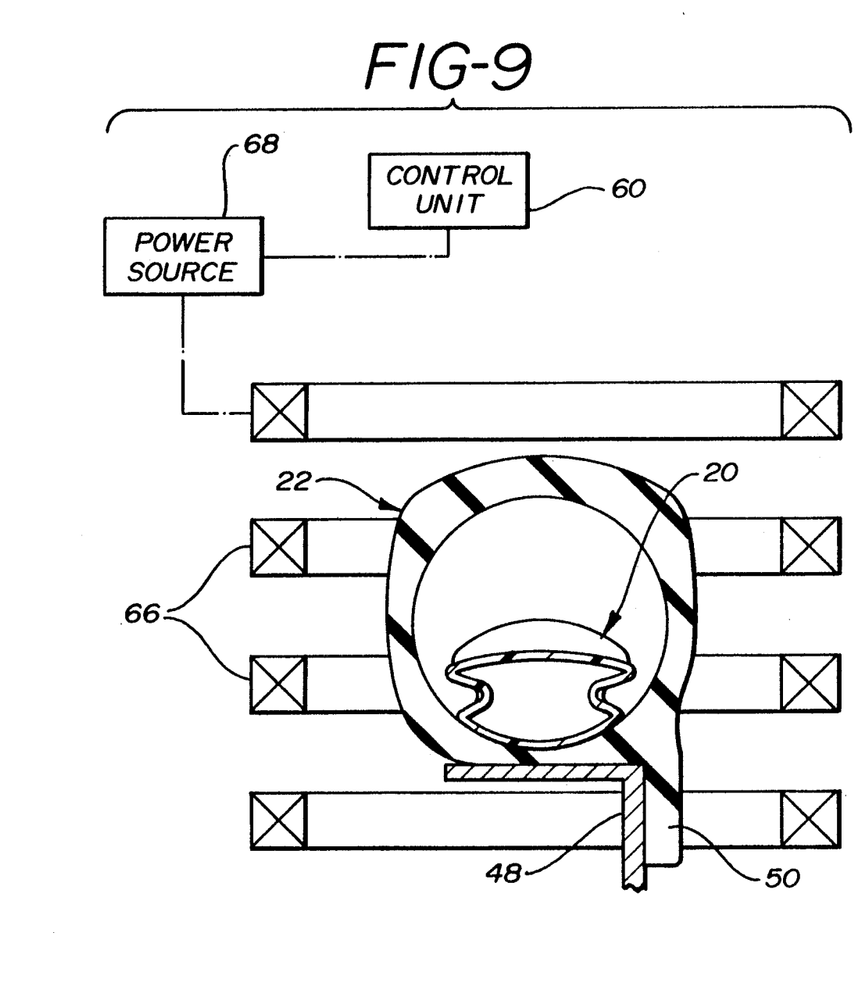
FIG. 9 is partially a block diagram and partially a schematic cross-sectional view, showing an alternative assembly for heating mold member 20 during different stages of the manufacturing process of FIG. 7.

The heating of mold member 20 may alternatively be accomplished through magnetic induction, as depicted in FIG. 9. In this case, mold member 20 is made of a material incorporating metallic particles. Prior to the molding of external tire member 22, mold member 20 is placed within coils 66 of an electromagnet. A power source 68, preferably of alternating electrical current, is connected to coils 66 for energizing the coils to generate a magnetic field. The alternating magnetic field in turn generates heat energy in mold member 20 by rapidly oscillating magnetic dipoles in the metallic particles embedded in the mold member. Control unit 60 may be connected to power source 68 for automatically controlling the operation thereof.

Figure 10:
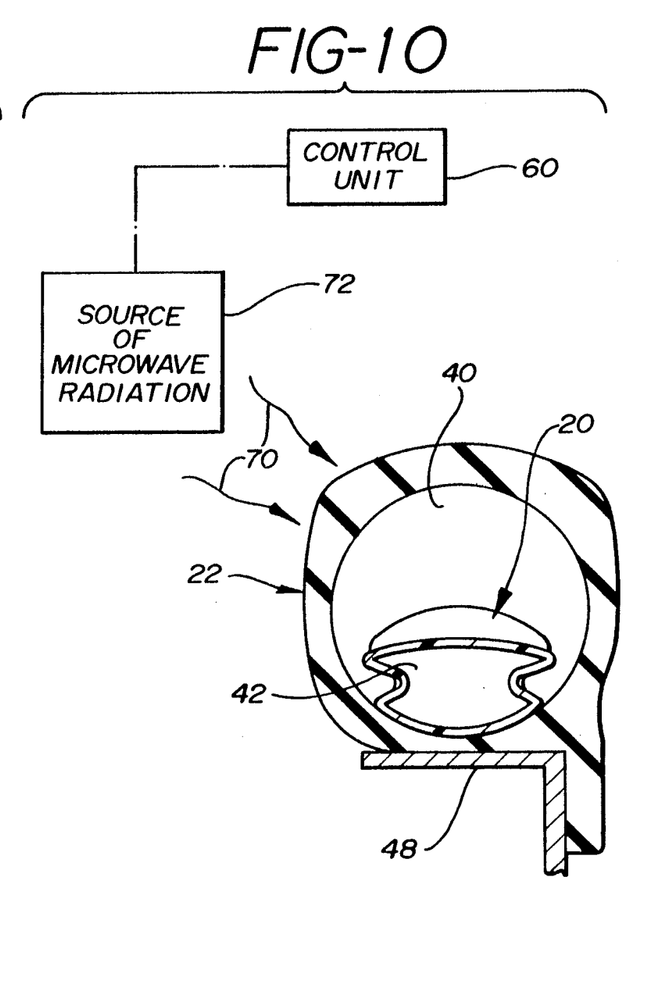
FIG. 10 is partially a block diagram and partially a cross-sectional view, showing yet another alternative assembly for heating mold member 20 during different stages of the manufacturing process of FIG. 7.

Yet another alternative method for heating mold member 20 prior to expansion thereof is illustrated in FIG. 10. In this case, electromagnetic radiation 70 in the microwave frequency range is generated by a source 72 and applied, for example, to a pressurizing liquid such as water pumped into mold member 20 at the beginning of a tire manufacturing cycle. Upon the heating of the liquid and a transfer of the heat to mold member 20 via convection, mold member 20 is pressurized and expanded, as described hereinabove. It may also be possible to heat mold member 20 directly by microwave energy if the material of the mold member absorbs electromagnetic radiation in the microwave range.

Upon the expansion of mold member 20 into substantially perfect toroid 54, a layer of rubber (not separately depicted) is wrapped around the toroid and then a filament or cord 74 is wound about the rubber layer, as indicated in FIG. 7 by an arrow 76. In some applications, it may be desirable to omit the provision and winding of filament or cord 74. To simplify the drawing, cord 74 is omitted from FIGS. 5 and 6.

Upon the completion of the winding operation, rubber material is molded in a toroidal form about mold member toroid 54 and simultaneously cast to wheel member 48. During this molding step, external tire member 22 is produced together with radially inwardly projecting annular extension 50 integrally cast to wheel body 46. The molded rubber material of external tire member 22 is then vulcanized. Expanded mold member or toroid 54 is maintained in its expanded form and acts as a cure bag during the vulcanization step.

Upon the formation of tire member 22, control unit 60 (FIGS. 7 and 8) operates valve assembly 58 to withdraw fluid from mold member 20 and thereby contract it from the shape of toroid 54 to the original annular corrugated form. To that end, valve assembly 58 may be connected to a vacuum source 78 (e.g., a pump). To facilitate the contraction process, outer annular chamber 40 may be filled with pressurized fluid from source 52 via valve assembly 58.

Upon the deflation or contraction of the expanded mold member 20, it is retained in tire member 22 and forms a run-flat component of the finished tire.

Although the invention has been described in terms of specific embodiments and applications, one of ordinary skill in the art, in light of this teaching, can generate additional embodiments and modifications without departing from the spirit of the invention. Accordingly, it is to be understood that the descriptions and illustrations herein are proffered to facilitate comprehension of the invention and should not be taken to limit the scope thereof.

What is claimed is:

1. A method for manufacturing a tire, comprising the steps of:
   providing an internal mold member made of a resilient material with a memory, said mold member having a predetermined annular shape;
   expanding said mold member from said predetermined annular shape into a toroidal shape;
   forming a closed torus external tire member about the expanded mold member;
   maintaining said mold member in the expanded toroidal shape during molding of said tire member;
   upon formation of said tire member, contracting said mold member from said toroidal shape so that said mold member essentially resumes said annular shape; and
   retaining said mold member inside said tire member so that said mold member becomes a portion of the tire.

2. A method as set forth in claim 1, further comprising the step of heating said mold member prior to said step of expanding.

3. A method as set forth in claim 2 wherein said step of expanding includes the step of pressurizing said mold member with a fluid.

4. A method as set forth in claim 3, further comprising the step of reheating said mold member upon formation of said tire member and prior to said step of contracting.

5. A method as set forth in claim 4 wherein said step of contracting includes the step of withdrawing fluid from said mold member.

6. A method as set forth in claim 5 wherein said step of contracting further includes the step of pressurizing a space located between said mold member and said tire member.

7. A method as set forth in claim 5 wherein said step of reheating said mold member includes the step of applying microwave energy.

8. A method as set forth in claim 5 wherein said mold member is made of a material incorporating metallic particles and wherein said step of reheating includes the step of heating by induction.

9. A method as set forth in claim 5 wherein said step of forming includes the steps of wrapping a layer of rubber about said mold member upon expansion thereof into said toroidal shape and subsequently winding a filament or cord about the wrapped layer of rubber.

10. A method as set forth in claim 9 wherein said step of forming further includes the step of molding a rubber material in a toroidal form about the wound filament or cord, the wrapped layer of rubber and said mold member.

11. A method as set forth in claim 10 wherein said step of forming further includes the step of vulcanizing the molded rubber material.

12. A method as set forth in claim 10 wherein said step of forming further includes the step of casting said rubber material integrally to a central wheel member.

13. A method as set forth in claim 5 wherein said mold member is made of synthetic resin material.

14. A method as set forth in claim 13 wherein said synthetic resin material is polyethylene.

15. A method as set forth in claim 2 wherein said step of heating includes the step of injecting a heated fluid into said mold member.

16. A method as set forth in claim 2 wherein said step of heating includes the step of applying microwave energy.

17. A method as set forth in claim 2 wherein said mold member is made of a material incorporating metallic particles and wherein said step of heating includes the step of heating by induction.

18. A method as set forth in claim 1 wherein said step of expanding includes the step of pressurizing said mold member with a gas or a liquid.

19. A method as set forth in claim 1 wherein said step of contracting includes the step of applying suction to an annular chamber defined by said mold member in said expanded toroidal shape.

20. A method as set forth in claim 1 wherein said step of contracting includes the step of pressurizing a space located between said mold member and said tire member.

21. A method as set forth in claim 1, further comprising the step of heating said mold member upon formation of said tire member and prior to said step of contracting.

22. A method as set forth in claim 21 wherein said step of heating said mold member includes the step of applying microwave energy.

23. A method as set forth in claim 21 wherein said mold member is made of a material incorporating metallic particles and wherein said step of heating includes the step of heating by induction.

24. A method as set forth in claim 1 wherein said step of forming includes the steps of wrapping a layer of rubber about said mold member upon expansion thereof into said toroidal shape and subsequently winding a filament or cord about the wrapped layer of rubber.

25. A method as set forth in claim 24 wherein said step of forming further includes the step of molding a rubber material in a toroidal form about the wound filament or cord, the wrapped layer of rubber and said mold member.

26. A method as set forth in claim 25 wherein said step of forming further includes the step of vulcanizing the molded rubber material.

27. A method as set forth in claim 25 wherein said step of forming further includes the step of casting said rubber material integrally to a central wheel member.

28. A method as set forth in claim 1 wherein said mold member is made of synthetic resin material.

29. A method as set forth in claim 28 wherein said synthetic resin material is polyethylene.

30. A method as set forth in claim 1 wherein said mold member has a substantially cylindrical inner wall and a corrugated opposed outer wall.

31. A method as set forth in claim 30 wherein said mold member has a radial width dimension varying in a circumferential direction between a maximum value and a minimum value.

32. A method as set forth in claim 31 wherein said radial width dimension varies with a predetermined angular periodicity between said maximum value and said minimum value.

33. A tire comprising:
a substantially hollow run-flat member expandable from a predetermined annular configuration to a predetermined toroidal configuration, said run-flat member being made of a synthetic resin with a memory so that said run-flat member resumes said annular configuration upon collapse from said toroidal configuration;
a closed-torus outer tire member substantially surrounding said run-flat member; and
means for attaching said outer tire member at an axle of an automotive vehicle.

34. A tire as set forth in claim 33 wherein said run-flat member has a substantially cylindrical inner wall and a corrugated opposed outer wall.

35. A tire as set forth in claim 34 wherein said run-flat member has a radial width dimension which varies between a maximum value and a minimum value.

36. A tire as set forth in claim 35 wherein said radial width dimension varies with a predetermined angular periodicity between said maximum value and said minimum value.

37. A tire as set forth in claim 36 wherein said outer tire member includes a wound elongate tensile element.

38. A tire as set forth in claim 37 wherein said tensile element is as least partially embedded in a rubber material.

39. A tire as set forth in claim 36 wherein said means for attaching includes a wheel member, said outer tire member being fastened to said wheel member.

40. A tire as set forth in claim 39 wherein said outer tire member is integrally cast to said wheel member.

41. A tire as set forth in claim 33 wherein said synthetic resin material is polyethylene.

42. A tire as set forth in claim 33 wherein said run-flat member has a radial width dimension varying along a circumferential direction to form a bumpy riding surface.

43. A tire as set forth in claim 33 wherein said outer tire member includes a wound elongate tensile element.

44. A tire as set forth in claim 43 wherein said tensile element is at least partially embedded in a rubber material.

45. A tire as set forth in claim 33 wherein said means for attaching includes a wheel member, said outer tire member being fastened to said wheel member.

46. A tire as set forth in claim 45 wherein said outer tire member is integrally cast to said wheel member.

47. A closed substantially toroidal run-flat inner tire member in the form of a substantially hollow member expandable from a predetermined annular configuration to a predetermined toroidal configuration, said hollow member being made of a synthetic resin with a memory so that said hollow member resumes said annular configuration upon collapse from said toroidal configuration, said tire member having a substantially cylindrical inner wall with a substantially uniform radius and an opposed outer wall of varying radial disposition to form a bumpy riding surface.

48. A tire member as set forth in claim 47 wherein said radial width dimension varies between a maximum value and a minimum value.

49. A tire member as set forth in claim 48 wherein said radial width dimension varies with a predetermined angular periodicity between said maximum value and said minimum value.

50. A tire member as set forth in claim 47 wherein said synthetic resin material is polyethylene.

* * * * *